United States Patent [19]

Najjar

[11] Patent Number: 4,671,804

[45] Date of Patent: Jun. 9, 1987

[54] PARTIAL OXIDATION PROCESS

[75] Inventor: Mitri S. Najjar, Hopewell Junction, N.Y.

[73] Assignee: Texaco Inc., White Plains, N.Y.

[21] Appl. No.: 803,264

[22] Filed: Nov. 29, 1985

[51] Int. Cl.$^4$ ................................................ C10J 3/46
[52] U.S. Cl. ..................................... 48/197 R; 48/206; 48/DIG. 7; 252/373; 44/1 SR
[58] Field of Search ................... 48/197 R, 206, 210, 48/DIG. 7, 212, 215; 110/342; 75/257; 44/1 R, 19, 1 SR; 252/373

[56] References Cited

U.S. PATENT DOCUMENTS

| | | | |
|---|---|---|---|
| 1,955,574 | 4/1934 | Benner et al. | 110/342 |
| 3,823,676 | 7/1974 | Cook et al. | 110/342 |
| 4,207,211 | 6/1980 | Russ et al. | 253/373 |
| 4,234,451 | 11/1980 | Jockel et al. | 252/373 |
| 4,277,365 | 7/1981 | Paull et al. | 48/197 R |
| 4,308,808 | 1/1982 | Brown | 48/DIG. 7 |
| 4,322,221 | 3/1982 | Kamody | 48/DIG. 7 |
| 4,323,475 | 4/1982 | Ball et al. | 252/373 |
| 4,367,168 | 1/1983 | Roors et al. | 252/373 |
| 4,436,531 | 3/1984 | Estabrook | 48/DIG. 7 |
| 4,504,282 | 3/1985 | Smith | 48/197 R |

Primary Examiner—David L. Lacey
Attorney, Agent, or Firm—Robert A. Kulason; James J. O'Loughlin; Albert Brent

[57] ABSTRACT

Synthesis gas is produced by the partial oxidation of a fuel feedstock comprising sulfur-containing petroleum coke and/or heavy liquid hydrocarbonaceous fuel and having a nickel and iron-containing ash in a free-flow refractory lined partial oxidation reaction zone. The production of toxic nickel subsulfide ($Ni_3S_2$) in said slag is prevented, and there is a substantial reduction in the concentration of $H_2S+COS$ in the raw product gas stream by introducing an iron-containing additive into the reaction zone along with the feed. The weight ratio of iron-containing additive to ash in the fuel feedstock is in the range of about 0.5 to 10.0. The weight ratio of iron to nickel in said mixture of iron-containing additive and fuel feedstock is greater than 0.33. The additive combines with at least a portion of the nickel and iron constituents and sulfur found in the feedstock to produce a very fluid sulfide phase of iron and nickel, and an Fe, Ni alloy phase. In another embodiment, a minor amount of a calcium compound is included with the iron-containing additive only at startup to reduce the softening temperature of the iron-containing addition agent. By this method, the molten slag produced is free from toxic $Ni_3S_2$ and has a comparatively reduced viscosity. Further, the slag may be readily removed from the gas generator at a lower temperature and may be disposed of without contaminating the environment. Further, the life of the refractory lining is extended.

27 Claims, No Drawings

PARTIAL OXIDATION PROCESS

FIELD OF THE INVENTION

This invention relates to a process for the partial oxidation of sulfur-containing heavy liquid hydrocarbonaceous fuels with a nickel and iron-containing ash, sulfur-containing petroleum coke with a nickel and iron-containing ash, or mixtures thereof to produce gaseous mixtures comprising $H_2+CO$ and entrained molten slag. More particularly, it pertains to an additive system for preventing the formation of toxic $Ni_3S_2$ in said molten slag.

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. For example, the presence of toxic $Ni_3S_2$ in the coke ash severely limits its use. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the coke or the ash-containing heavy liquid hydrocarbonaceous fuel. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and legislation requiring total use of feed crude should shortly bring about a greater utilization of petroleum coke feeds to the partial oxidation gas generator.

Previous gasification runs with delayed coke and heavy liquid hydrocarbonaceous fuel gave rise to some unexpected operating problems. For example, a very fine intergrowth of toxic nickel subsulfide ($Ni_3S_2$) was found in slag produced by the partial oxidation of sulfur-containing heavy liquid hydrocarbonaceous fuels and/or petroleum coke with said fuels having a nickel and iron-containing ash. Further, the ash which normally melts and is discharged from the gasifier as a slag, was not melting completely and being discharged but was building up on the walls of the refractory. Nickel impurities may under certain conditions form troublesome nickel carbonyl deposits downstream in the system. Fluxing as used in coal operations and in U.S. Pat. Nos. 1,799,885 and 2,644,745 do not provide a solution to applicant's problem involving troublesome nickel. The subject invention is an improvement in the art since it permits operation of the partial oxidation gas generator without the production of ash containing toxic nickel subsulfide.

SUMMARY OF THE INVENTION

This is a process for the production of gaseous mixtures comprising $H_2+CO$ by the partial oxidation of a fuel feedstock comprising a heavy liquid hydrocarbonaceous fuel containing sulfur and having a nickel and iron-containing ash or petroleum coke containing sulfur and having a nickel and iron-containing ash, or mixtures thereof. Further, said feedstocks include a minimum of 0.5 wt. % of sulfur, such as about 1.0 to 4.5 wt. %; and said ash includes a minimum of 0.5 ppm (parts per million) of nickel, such as about 2.0 to 4000 ppm, a minimum of 0.5 ppm of iron, such as about 2.0 to 2000 ppm, and a minimum of 2.0 ppm of silicon, such as about 5 to 7200 ppm, or more. An additive system is provided which prevents the formation of toxic nickel subsulfide ($Ni_3S_2$) in slags generated during the partial oxidation of said feedstocks without raising the activity and pressure of sulfur-bearing gases e.g. $H_2S$, COS. The cost of a downstream gas purification system is thereby minimized. The process includes the steps of (1) mixing together an iron-containing additive with said feedstock; wherein the weight ratio of iron-containing additive to ash in said fuel feedstock is in the range of about 0.5 to 10.0; and the weight ratio of iron to nickel in said mixture of iron-containing additive and fuel feedstock is greater than 0.33; (2) reacting said mixture from (1) at a temperature in the range of 2200° F. to 3000° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and molten slag; and where in said reaction zone said iron-containing additive combines with at least a portion of said nickel and iron constituents and sulfur found in the feedstock to produce said molten slag comprising the following two phases: (i) a fluid sulfide phase comprising the sulfides of iron and nickel having a minimum weight ratio of iron to nickel of 0.33, such as in the range of about 1 to 10, and a minimum sulfur content of 36 wt. % (weight percent), such as in the range of about 40 to 60 wt. %; and (ii) an Fe, Ni alloy phase wherein Fe is in the range of about 30 to 95 wt. %, such as about 70 to 90 wt. %, and nickel is in the range of about 5 to 70 wt. %, such as about 10 to 30 wt. %; and (3) separating nongaseous materials containing substantially no $Ni_3S_2$ from said hot raw effluent gas stream.

In another embodiment, a mixture of sulfur-containing heavy liquid hydrocarbonaceous fuel with a nickel and iron-containing ash, and said iron-containing additive is fed to a coker to produce sulfur-containing petroleum coke with a nickel and iron-containing ash, and with said additive being uniformly dispersed throughout said petroleum coke. This petroleum coke is then reacted in the partial oxidation gas generator to produce synthesis gas, reducing gas, or fuel gas.

In still another embodiment, in addition to the iron-containing additive, a small amount of calcium compound, such as one selected from the group of compounds of calcium consisting of oxides, sulfides, and mixtures thereof is introduced into the reaction zone. The life of the refractory lining in the reaction zone is thereby increased.

DISCLOSURE OF THE INVENTION

The partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the subject process uses relatively inexpensive fuel feedstocks comprising sulfur-containing heavy liquid hydrocarbonaceous fuel and/or petroleum coke feedstocks with said materials having a nickel and iron-containing ash. The expression "and/or" as used herein means either one or both of the items or materials specified. Further, these feedstocks include a minimum of 0.5 wt. % of sulfur, such as in the range of about 1.5 to 4.5 wt. %; and said ash includes a minimum of 0.5 ppm of nickel, such as in the range of about 2.0 to 4000 ppm; a minimum of 0.5 ppm iron, such as in the range of about 2.0 to 2000 ppm; a minimum of 2.0 ppm of silicon, such as in the range of about 5 to 7200 ppm, or more.

By definition, the term sulfur-containing heavy liquid hydrocarbonaceous material or fuel having a nickel and iron-containing ash is a petroleum or coal derived fuel selected from the group consisting of virgin crude, residue from petroleum distillation and cracking, petroleum distillate, reduced crude, whole crude, asphalt, coal tar, coal derived oil, shale oil, tar sand oil, and mixtures thereof.

By definition, the term sulfur-containing petroleum coke having a nickel and iron-containing ash is petroleum coke made from sulfur-containing heavy liquid hydrocarbonaceous fuel having a nickel and iron-containing ash by conventional coke methods such as by the delayed or fluid coking process, such as described in coassigned U.S. Pat. No. 3,673,080, which is incorporated herein by reference.

Closer study of the ashes derived from the partial oxidation, without an additive, of a feedstock comprising sulfur-containing heavy liquid hydrocarbonaceous fuels and/or petroleum coke having nickel and iron-containing ashes shows that they are largely composed of oxide and sulfide compounds of nickel, vanadium, iron, along with some normally occurring mineral matter species. The metals present in the ash provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10-20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation gas generator and not flow smoothly from the gasifier under normal gasifier conditions. These materials prove to be very corrosive to refractory thereby decreasing the life of the refractory lining of the reaction zone. These problems and others are minimized by the subject process in which the amount of nickel constituents remaining in the reaction zone are substantially reduced or eliminated.

This invention provides an improved iron-containing additive system to prevent the formation of toxic nickel subsulfide ($Ni_3S_2$) in slags generated during the partial oxidation of sulfur, nickel, and iron-containing heavy liquid hydrocarbonaceous and/or petroleum coke feedstocks. Without the subject invention, there may be about 0.1 to 5.0 wt. % of troublesome toxic nickel subsulfide in the slag. Another advantage of the subject invention is the reduction in the activity, pressure, and concentration of sulfur-bearing gases e.g. $H_2S$ and COS. For example, the concentration of $H_2S+COS$ in the raw product gas stream from the partial oxidation gas generator may be reduced in the range of about 5 to 100 %, such as about 20 to 60 %, by the subject invention, in comparison with the concentration of $H_2S+COS$ in the raw product gas stream as produced without the iron-containing addition agent. The cost of downstream gas purification is thereby minimized. Further, a means of introducing the addition agent into the system to give maximum effectiveness is provided. In addition, the molten slag is produced with a reduced viscosity in comparison with molten slag produced by the same partial oxidation process but without the addition of said iron-containing addition agent. Accordingly, the molten ash may be readily removed from the gas generator at a lower temperature and safely disposed of without contaminating the environment.

The iron-containing additive comprises iron and/or an iron compound, preferably iron oxide. Sufficient iron-containing additive is introduced to provide a wt. ratio of iron-containing additive to ash in the fuel feedstock in the range of about 0.5 to 10.0, such as about 3.0. This ratio may be also expressed as 3 parts by wt. of iron-containing additive per part by wt. of ash in the fuel feedstock. Further, the weight ratio of iron to nickel in said mixture of iron-containing additive and fuel feedstock is greater than 0.33, such as in the range of about 1 to 10. In the reaction zone of the partial oxidation gas generator, the additive combines with at least a portion, such as substantially all or a large fraction e.g. about 40 to 100 wt. %, say about 70 to 90 wt. % of the nickel and iron constituents and sulfur found in the feedstock to produce molten slag comprising the following two phases: (i) a fluid sulfide phase comprising the sulfides of iron and nickel having a minimum weight ratio of iron to nickel of 0.33, such as in the range of about 1 to 10, and a minimum sulfur content of 36 wt. % (weight percent), such as in the range of about 40 to 60 wt. %; and (ii) an Fe, Ni alloy phase wherein Fe is present in the range of about 30 to 95 wt. %, such as about 70 to 90 wt. %, and nickel is present in the range of about 5 to 70 wt. %, such as about 10 to 30 wt. %. The formation of toxic $Ni_3S_2$ is thereby prevented. Advantageously, by the subject invention there is substantially no e.g. about 0 nickel subsulfide in the slag. Further, there is a substantial reduction of the mole ratio $H_2S+COS/H_2+CO$ over said mole ratio when the partial oxidation reaction takes place in the absence of said iron-containing addition agent. The sulfur potential in the gas, and the downstream gas cleaning costs may be substantially reduced or possibly eliminated.

The liquid sulfide phase materials in the molten slag are very fluid at the temperature prevailing in the reaction zone. The viscosity of these materials at 2000° F. is in the range of about 5 to 100 poises. Further, it was unexpectedly found that these liquid sulfide phase materials have a strong wetting capability for other metal constituents in the slag, such as the high temperature non-flowing vanadium-containing oxide laths and spinels. These liquid sulfide phase materials function in a completely different manner than that of a typical fluxing additive which may be used for example to solubilize slag constituents in coal. For example, it was unexpectedly found that these liquid sulfide phase materials act as washing agents. They do not solubilize the troublesome vanadium-containing oxide laths and spinels. Rather, they serve as a carrier and wash them out of the reaction zone. These washing agents wash at least a portion, such as from about 40 to 100 wt. %, such as about 60 to 80 wt. %, and preferably all of the vanadium-containing contaminants out of the reaction zone of the partial oxidation gas generator. The mixture of these liquid sulfide phase materials and vanadium oxide is referred to herein as slag and comprise about 1 to 10 wt. %, such as about 4 to 8 wt. % of vanadium oxide.

The effects of high and low concentrations of sulfur and silicon in the mixture of iron-containing additive and fuel feedstock on the formation of major and minor phases in the slag that brings about the destabilization of $Ni_3S_2$ are summarized in Table I below. With respect to the fuel feedstock, by definition: low sulfur —pertains to about 0.5 to 1.5 wt. % sulfur (basis weight of fuel feedstock); high sulfur—pertains to about 1.6 to 4.5 wt. % sulfur (basis weight of fuel feedstock; low silicon— pertains to silicon in the range of about 10 to 400 ppm (basis weight of ash in the ash-containing fuel feedstock); and high silicon pertains to silicon in the range of about 410 ppm to 7200 ppm or more (basis weight of ash in the ash-containing fuel feedstock). The major phase constitutes about 90 wt. % or more of the slag. The minor phase comprises the remainder of the slag, and is at least 1 to 10 wt. %.

TABLE I

Effect of Sulfur and Silicon Content In Fuel Feedstock On The Major and Minor Phases In The Slag

| Low Sulfur Low Silicon | Low Sulfur High Silicon | High Sulfur High Silicon | High Sulfur Low Silicon |
|---|---|---|---|
| Major Sulfide Phase of Iron & Nickel | Fe—Ni Alloy Major Phase | About 20 to 80 wt. % Fe—Ni Alloy | Major Sulfide Phase of Iron & Nickel |
| Fe—Ni Alloy Minor Phase | Minor Sulfide Phase of Iron & Nickel | Remainder Sulfide Phase of Iron & Nickel | Fe—Ni Alloy Minor Phase |

In another embodiment of the invention, it was unexpectedly found that the softening temperature of the iron-containing addition agent could be reduced about 100°–300° F. by introducing a calcium compound along with the iron-containing addition agent. The calcium compound may be selected from the group consisting of calcium oxide, calcium carbonate and calcium hydroxide. By adding calcium in this manner, the partial oxidation gas generator may be started up at a lower temperature e.g. about 200 to 300° F. lower. The calcium compound is temporarily introduced into the partial oxidation reaction zone at start-up in admixture with the fuel feedstock and/or iron-containing addition agent in the critical amount of about 2.0 to 8.0 wt. % or below of the iron-containing addition agent. By lowering the softening temperature of the iron-containing addition agent, the calcium compound enhances the rate of sulfur pick-up in the slag. It was found that when the addition of calcium compound exceeded 8.0 wt. % of the iron-containing addition agent then calcium sulfide and calcium carbonate would clog up the central passage of the dip tube thereby blocking the discharge of the hot effluent gas stream from the reaction zone into the quench water.

Shortly after start-up when the sulfur begins to transfer into the molten slag, the liquid sulfide slag of iron and nickel will lower the softening temperature of the iron-containing agent thus eliminating thereafter the need of introducing calcium. Excess calcium will pick up the sulfur to form an undesirable viscous calcium sulfide phase. Keeping the amount of calcium to 8.0 wt. % and below of the iron-containing addition agent will ensure that the fluid iron and nickel sulfide phase will effectively wash the localized high melting calcium sulfide phase and the high melting vanadium laths and spinels. The use of calcium in this manner in admixture with the iron-containing additive is substantially different from the use of an ash fluxant, as described in coassigned U.S. Pat. No. 4,277,365.

Advantageously by the subject process, the molten slag which is produced in the reaction zone is free from toxic $Ni_3S_2$ and has a lower viscosity e.g. less than 100 poises at 2000° F., in comparison with prior art high viscosity slag. This facilitates slag removal. Further, at shut-down of the gasifier, the refractory walls of the reaction zone are provided clean with substantially no net accumulation of vanadium contaminants.

The partial oxidation reaction takes place in a reducing atmosphere under the following conditions: temperature—2200° F. to 3000° F., such as about 2300° F. to 2700° F.; say about 2725° F. to 2825° F.; pressure— about 5 to 250 atmospheres, such as about 15 to 200 atmospheres; when steam or water is used as a temperature moderator, the $H_2O$/fuel weight ratio is in the range of about 0.1 to 5.0, such as about 0.2 to 0.9; and the atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 3, COS nil to 0.1, $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water and with or without dewatering, the gas stream may be employed as synthesis gas, reducing gas or fuel gas.

Another aspect of this invention is that the iron-containing additive may be selected on the basis of serendipitous catalytic properties in addition to its use in the generation of the washing agent, as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the iron-containing additive.

It was unexpectedly found that a preferred iron-containing additive for mixing with the sulfur-containing heavy liquid hydrocarbonaceous material having a nickel and iron-containing ash or sulfur-containing petroleum coke having a nickel and iron-containing ash comprises iron and/or iron compounds selected from the group consisting of oxides, sulfides, sulfates, carbonates, cyanides, chlorides, nitrates, and mixtures thereof. In another embodiment, the iron compound is a water soluble iron salt. In still another embodiment the iron compound is a ferro or ferri organic compound selected from the group consisting of naphthenates, oxalates, acetates, citrates, benzoates, oleates, tartrates, and mixtures thereof. The iron-containing additive may comprise about 30.0 to 100 wt. % of an iron compound.

In the preferred embodiment of the subject invention, a mixture comprising the aforesaid fuel feedstock comprising sulfur-containing heavy liquid hydrocarbonaceous fuel having a nickel and iron-containing ash and/or the sulfur-containing petroleum coke having a nickel and iron-containing ash, the iron-containing additive, and optionally said previously described calcium compound are introduced into the partial oxidation gasifier. In another embodiment, the iron-containing additive, and optionally said calcium compound, are mixed with the sulfur-containing heavy liquid hydrocarbonaceous material having a nickel and iron-containing ash. The mixture is then fed into a conventional coking unit to produce petroleum coke. By this means, the finely ground iron-containing additive, and optionally said calcium compound may be intimately mixed throughout the petroleum coke product. The comminuted iron-containing additive, calcium compound, and the comminuted petroleum coke and mixtures thereof have a particle size so that 100% passes through a sieve of the size ASTM E-11 Standard Sieve Designation in the range of about 425 microns to 38 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous material or both to produce a pumpable slurry having a solids content in the range of about 50-65 wt.%. Alternatively, the solid materials may be wet ground with the liquid slurry medium. Alternatively, the mixture of particulate solids may be entrained in a gaseous medium and then introduced into the gas generator. The gaseous transport medium may be selected from the group consisting of steam, $CO_2$, $N_2$, free-oxygen containing gas, recycle synthesis gas, and mixtures thereof.

In the embodiment wherein ground iron-containing additive is mixed with the sulfur-containing heavy liquid hydrocarbonaceous fuel having a nickel and iron-containing ash and fed into a coker, the iron-containing washing additive may be introduced directly into the ash-containing petroleum liquid feed to the vacuum distillation tower, which normally precedes the coker unit. In either unit operation (coking or distillation), substantially all of the iron-containing additive should stay behind in the desired bottoms stream. In other words, there should be little, if any, carry over of the additive with the lighter products. A possible advantage for mixing the additive with the vacuum tower feedstream in preference to the bottoms stream (i.e. coker feed) is that the feed to the vacuum tower is significantly less viscous than the bottoms from the vacuum tower. A more thorough mixing may be thereby effected.

For example, a mixture comprising a high boiling liquid petroleum i.e. sulfur-containing heavy liquid hydrocarbonaceous fuel having a nickel and iron-containing ash and the comminuted iron-containing additive, with or without calcium compound, at a temperature in the range of about 650° F. to 930° F. is introduced into a delayed coking zone, for example by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with iron-containing additive, and optionally the calcium compound, is removed from the bottom of said delayed coking zone.

In another embodiment, a mixture comprising a sulfur-containing high boiling liquid petroleum having a nickel and iron-containing ash and the comminuted iron-containing additive, with or without calcium compound, at a temperature in the range of about 550° F. to 750° F. is introduced into a fluidized bed coking zone for example by way of line 31, such as shown and described in U.S Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems as discussed for coke. Thus, the invention of introducing an iron-containing additive and optionally calcium compound as part of the petroleum processing prior to gasification should, depending on the specific process, produce a feedstock that will be free of the gasification problems mentioned above. Most of these processes employ vacuum distillation as pretreatment. Accordingly, as described above, the iron-containing addition agent may be mixed with the vacuum distillation feed having a nickel and iron-containing ash. The additives will then emerge from the distillation column in the bottoms stream. In turn, the bottoms stream is the feed stream for the upgrading process. This incorporation of the iron-containing additive, and optionally the calcium compound, should not adversely affect these processes, and the addition agents should ultimately emerge with the nickel and iron-containing residue stream from each respective process. In all of these processes, this residue stream should be suitable for gasification by partial oxidation.

EXAMPLES

The following examples are offered as a better understanding of the present invention, but the invention is not to be construed as limited thereto.

EXAMPLE I

Synthesis gas substantially comprising in mole % dry basis $H_2$ 25 to 45, CO 20 to 55, $CO_2$ 5 to 35, $CH_4$ 0.06 to 8.0, and $H_2S+COS$ nil to 3.0 is produced in a free-flow refractory lined partial oxidation reaction zone, such as that shown and described in coassigned U.S. Pat. No. 3,607,157, which is incorporated herein by reference. The feedstock comprises an atomized aqueous dispersion or a dispersion of substantially dry sulfur-containing petroleum coke having a nickel-containing ash and being entrained in a gaseous transport medium comprising a mixture of free-oxygen containing gas and steam. The ash in the petroleum coke comprises about 5.0 wt. % of nickel, and about 2.5 wt. % iron, and contains less than about 400 parts per million of silicon. About 4.34 wt. % of sulfur is present in the petroleum coke. The petroleum coke has uniformly dispersed therein an iron-containing additive comprising about 100 wt. % of iron oxide. The wt. ratio of iron-containing additive to ash is about 5 to 1. The weight ratio of iron to nickel in the reaction zone is about 10 to 1. In another run the sulfur-containing petroleum coke having a nickel-containing ash and being in admixture with the iron and calcium-containing additive is introduced into the free-flow partial oxidation zone as a pumpable slurry of petroleum coke in water. The solids content of the slurry is about 60 weight percent.

The petroleum coke is reacted with a free-oxygen containing gas e.g. air, in the presence of a temperature moderator e.g. $H_2O$, in the refractory lined partial oxidation reaction zone at an autogenous temperature of about 2750° F. and a pressure of about 6 atmospheres. The molten slag droplets are readily separated from the hot effluent gas stream leaving the reaction zone by gravity or by quenching and/or scrubbing the gas stream with water or other gas scrubbing medium. The ash fusion temperature (°F.) for the slag is below 2100° F. In comparison, the ash fusion of the coarse slag with no iron-containing additive is greater than 2750° F. There is no toxic $Ni_3S_2$ in the slag. The chemical composition of the slag in wt. % is shown in Table II below.

TABLE II

| Chemical Composition of Slag | | | | | | | |
|---|---|---|---|---|---|---|---|
| FeS | NiS | FeO | CaO | CaS | $SiO_2$ | $V_2O_3$ | Others[1] |
| 81.1 | 1.2 | 4.1 | 0.8 | 1.2 | 1.1 | 6.3 | 4.2 |

[1]minor ash components and refractory pick-up

EXAMPLE II

Aqueous slurries of sulfur-containing delayed petroleum coke having nickel and iron-containing ashes and having a solids content of 0.52 wt. % were subjected to partial oxidation in a free-flow reaction zone at a temperature of 2600° F. and a pressure of 60 atmospheres. Run No. 1 was made with no iron-containing additive and with a weight ratio of iron to nickel in the fuel feedstock of 0.25. Run No. 2 was made with a weight ratio of iron oxide additive to ash in the fuel feedstock of 6.0, and with a weight ratio of iron to nickel in the mixture of iron-containing additive and fuel feedstock of 18.9. The results are summarized in Table III.

TABLE III

| Run No. | Iron-Containing Additive | Sulfur in Feed wt. % | Composition of Syngas Vol. % | | | | | % S In Feed Converted To | | Toxic $Ni_3S_2$ in Slag wt. % |
|---|---|---|---|---|---|---|---|---|---|---|
| | | | $H_2S$ | COS | $H_2$ | CO | $CO_2$ | $H_2S$ + COS | Slag | |
| 1 | No | 3.92 | 1.05 | 0.04 | 33.49 | 52.41 | 12.01 | 94.11 | 5.89 | 0.73 |
| 2 | Yes | 4.34 | 0.81 | 0.02 | 31.72 | 52.74 | 11.80 | 66.17 | 33.83 | 0 |

From the data in Table III, it is clearly evident that by introducing into the partial oxidation gas generator the subject iron-containing additive along with the petroleum coke feedstock, there is a reduction of about 28 volume percent in the amount of sulfur in the petroleum coke feedstock that is converted into sulfur-containing gases. This sulfur is easily removed in the molten slag thereby reducing the cost of downstream gas purification. Further, the slag from Run No. 2 may be disposed of safely since it contains substantially no toxic $Ni_3S_2$.

Various modifications of the invention as herein before set forth may be made without departing from the spirit and scope thereof, and therefore, only such limitations should be made as are indicated in the appended claims.

I claim:

1. A process for the production of gaseous mixtures comprising $H_2+CO$ by the partial oxidation of a fuel feedstock comprising sulfur-containing heaving liquid hydrocarbonaceous fuel and/or petroluem coke said fuels having nickel and iron-containing ashes, or mixtures thereof; and said feedstock includes a minimum of 0.5 wt. % of sulfur; and said ash includes a minimum of 0.5 ppm nickel, a minimum of 0.5 ppm iron, and a minimum of 2.0 ppm of silicon; said process comprising:

(1) mixing together an iron-containing additive with said fuel feedstock; wherein the weight ratio of iron-containing additive to ash in said fuel feedstock is in the range of about 0.5–10.0; and the weight ratio of iron to nickel in said mixture of iron-containing additive and fuel feedstock is greater than 0.33;

(2) reacting said mixture from step (1) at a temperature in the range of 2200° F. to 3000° F. and a pressure in the range of about 5 to 250 atmospheres in a free-flow refractory lines partial oxidation reaction zone with a free-oxygen containing gas in the presence of a temperature moderator and in a reducing atmosphere to produce a hot raw effluent gas stream comprising $H_2+CO$ and entrained molten slag, and where in said reaction zone said iron-containing additive combines with at least a portion of said nickel and iron constituents and sulfur found in the feedstock to produce said molten slag comprising the following two phases: (i) a fluid sulfide phase comprising the sulfides of iron and nickel having a minimum weight ratio of iron to nickel of 0.33, and a minimum sulfur content of 36 weight percent; and (ii) an Fe, Ni alloy phase wherein Fe is in the range of about 30 to 95 wt. %, and nickel is in the range of about 5 to 70 wt. %; wherein there is a reduciton in the mole ratio $H_2S+COS/H_2+CO$ in the raw effluent gas stream over said mole ratio when said partial oxidation reaction takes place in the absence of said iron-containing addition agent; and (3) separating nongaseous materials containing substantially no $Ni_3S_2$ from said hot raw effluent gas stream.

2. The process of claim 1 wherein said iron-containing additive comprises iron and/or iron compounds selected from the group consisting of oxides, sulfides, sulfates, carbonates, cyanides, chlorides, nitrates, and mixtures thereof.

3. The process of claim 1 wherein said iron-containing additive is a ferro or ferri organic compound selected from the group consisting of naphthenates, oxalates, acetates, citrates, benzoates, oleates, sulfides, tartrates, and mixtures thereof.

4. The process of claim 1 wherein the iron containing portion of said iron-containing additive is a water soluble iron salt.

5. The process of claim 1 wherein said sulfur-containing heavy liquid hydrocarbonaceous fuel having a nickel and iron-containing ash feedstock is selected from the group consisting of crude residue from petroleum distillation and cracking process operations, petroleum distillate, reduced crude, whole crude, asphalt, coal tar, coal derived oil, shale oil, tar sand oil, and mixtures thereof.

6. The process of claim 1 wherein said sulfur-containing heavy liquid hydrocarbonaceous fuel having a nickel and iron-containing ash is a pumpable slurry of petroleum coke in water, liquid hydrocarbon fuel or mixtures thereof.

7. The process of claim 1 where in step (1) said iron-containing additive is introduced into the feed to or the bottoms from a vacuum distillation unit.

8. The process of claim 1 wherein said mixture of iron-containing additive and feedstock from step (1) has a particle size so that about 100% passes through a sieve of the size ASTM E-11 Standard Sieve Designation in the range of about 425 microns to 38 microns, or below.

9. The process of claim 1 wherein said iron-containing additive comprises about 30.0 to 100.0 wt. % of an iron compound.

10. The process of claim 1 wherein substantially all of the sulfur in said feedstock is converted into the sulfides of iron and nickel and leaves the reaction zone in the slag.

11. The process of claim 1 wherein a calcium compound in the amount of about 2.0 to below 8.0 wt. % of said iron-containing addition agent at start-up is introduced into the reaction zone of the partial oxidation reaction zone only at start-up to reduce the softening temperature of the iron-containing addition agent, and then discontinued.

12. The process of claim 1 wherein said iron-containing additive is iron oxide; and said iron oxide is in admixture with calcium oxide.

13. The process of claim 1 wherein said fuel feedstock contains about 0.5 to 1.5 wt. % sulfur and about 10 to 400 ppm of silicon and the molten slag produced in step (2) comprises about 90 wt. % or more of said sulfide phase of iron and nickel, and at least 1 to 10 wt. % of said Fe, Ni alloy phase.

14. The process of claim 1 wherein said fuel feedstock contains about 0.5 to 1.5 wt. % sulfur and about 410 ppm to 7200 ppm or more of silicon, and the molten slag produced in step (2) comprises about 90 wt. % or more of said Fe, Ni alloy phase, and at least 1 to 10 wt. % of said sulfide phase of iron and nickel.

15. The process of claim 1 wherein said fuel feedstock contains about 1.6 to 4.5 wt. % of sulfur and about 410 ppm to 7200 ppm or more of silicon, and the molten slag produced in step (2) comprises about 20 to 80 wt. % of said Fe, Ni alloy phase, and the remainder comprises said sulfide phase of iron and nickel.

16. The process of claim 1 wherein said fuel feedstock contains about 1.6 to 4.5 wt. % of sulfur and less than 400 ppm of silicon and the molten slag produced in step (2) comprises about 90 wt. % or more of said sulfide phase of iron and nickel, and at least 1 to 10 wt. % of said Fe-Ni alloy phase.

17. The process of claim 1 wherein the molten slag in step (2) is produced with a reduced viscosity in comparison with molten slag produced by the same partial oxidation process but without the addition of said iron-containing addition agent.

18. A process for the production of gaseous mixtures comprising $H_2+CO$ by the partial oxidation of a fuel feedstock comprising a sulfur-containing heavy liquid hydrocarbonaceous fuel having a nickel and iron-containing ash or sulfur-containing petroleum coke having a nickel and iron-containing ash, or mixtures thereof; and said feedstock includes a minimum of 0.5 wt. % of sulfur; and said ash includes a minimum of 0.5 ppm nickel, 0.5 ppm iron, and a minimum of 2.0 ppm of silicon; said process comprising:

(1) mixing together an iron-containing additive with said fuel feedstock; wherein the weight ratio of iron-containing additive to ash in said fuel feedstock is in the range of about 0.5–10; and the weight ratio of iron to nickel in said mixture of iron-containing additive and fuel feedstock is greater than 0.33;

(2) coking said mixture from step (1) to produce sulfur-containing petroleum coke having a nickel and iron-containing ash and having dispersed therein said iron-containing additive;

(3) introducing the petroleum coke from step (2) into a free-flow refractory lined partial oxidation reaction zone as a pumpable slurry of petroleum coke in water, liquid hydrocarbonaceous fluid or mixtures thereof, or as substantially dry petroleum coke entrained in a gaseous transport medium;

(4) reacting said petroleum coke from step (3) at a temperature in the range of 2200° F. to 3000° F. and a pressure in the range of about 5 to 250 atmospheres in said free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said iron-containing additive combines with a portion of said nickel and iron constituents and sulfur found in the feedstock to produce said molten slag comprising the following two phases: (i) a fluid sulfide phase comprising the sulfides of iron and nickel having a minimum weight ratio of iron to nickel of 0.33, and a minimum sulfur content of 36 weight percent; and (ii) an Fe, Ni alloy phase wherein Fe is in the range of about 30 to 95 wt. %, and nickel is in the range of about 5 to 70 wt. %; wherein there is a reduction in the mole ratio $H_2S+COS/H_2+CO$ over said mole ratio when said partial oxidation reaction takes place in the absence of said iron-containing addition agent; and and (5) separating nongaseous materials containing substantially no $Ni_3S_2$ from said hot raw effluent gas stream.

19. The process of claim 18 wherein said iron-containing additive comprises iron and/or iron compounds selected from the group consisting of oxides, sulfides, sulfates, carbonates, cyanides, chlorides, nitrates, and mixtures thereof.

20. The process of claim 18 wherein said mixture of iron-containing additive and feedstock from step (1) has a particle size so that 100% passes through a sieve of the size ASTM E-11 Standard Sieve Designation in the range of about 425 microns to 38 microns or below.

21. The process of claim 18 wherein said iron-containing additive includes an inorganic or organic compound of iron.

22. The process of claim 18 wherein said sulfur-containing heavy liquid hydrocarbonaceous fuel having a nickel-containing ash is a high boiling liquid petroleum feed to or the bottoms from a vacuum tower or a fractionator.

23. The process of claim 18 where in step (2) the mixture from step (1) at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead and said sulfur-containing petroleum coke having a nickel and iron-containing ash and having uniformly dispersed therein said iron-containing additive is removed from the bottom.

24. The process of claim 18 where in step (2) the mixture from step (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

25. The process of claim 18 where in step (5) said nongaseous materials are separated from said hot effluent gas stream by contacting the gas stream from step (4) with a water or oil scrubbing medium.

26. The process of claim 18 wherein substantially all of the sulfur in said feedstock is converted into the sulfides of iron and nickel and leaves the reaction zone in the slag.

27. The process of claim 18 wherein a calcium compound in the amount of about 2.0 to below 8.0 wt. % of said iron-containing addition agent is introduced into the reaction zone of the partial oxidation reaction zone only at start-up to reduce the softening temperature of the iron-containing addition agent, and then the introduction of said calcium compound is discontinued.

* * * * *